Sept. 11, 1962 P. F. HILL ET AL 3,052,938
SAFETY PIN
Filed Feb. 15, 1961
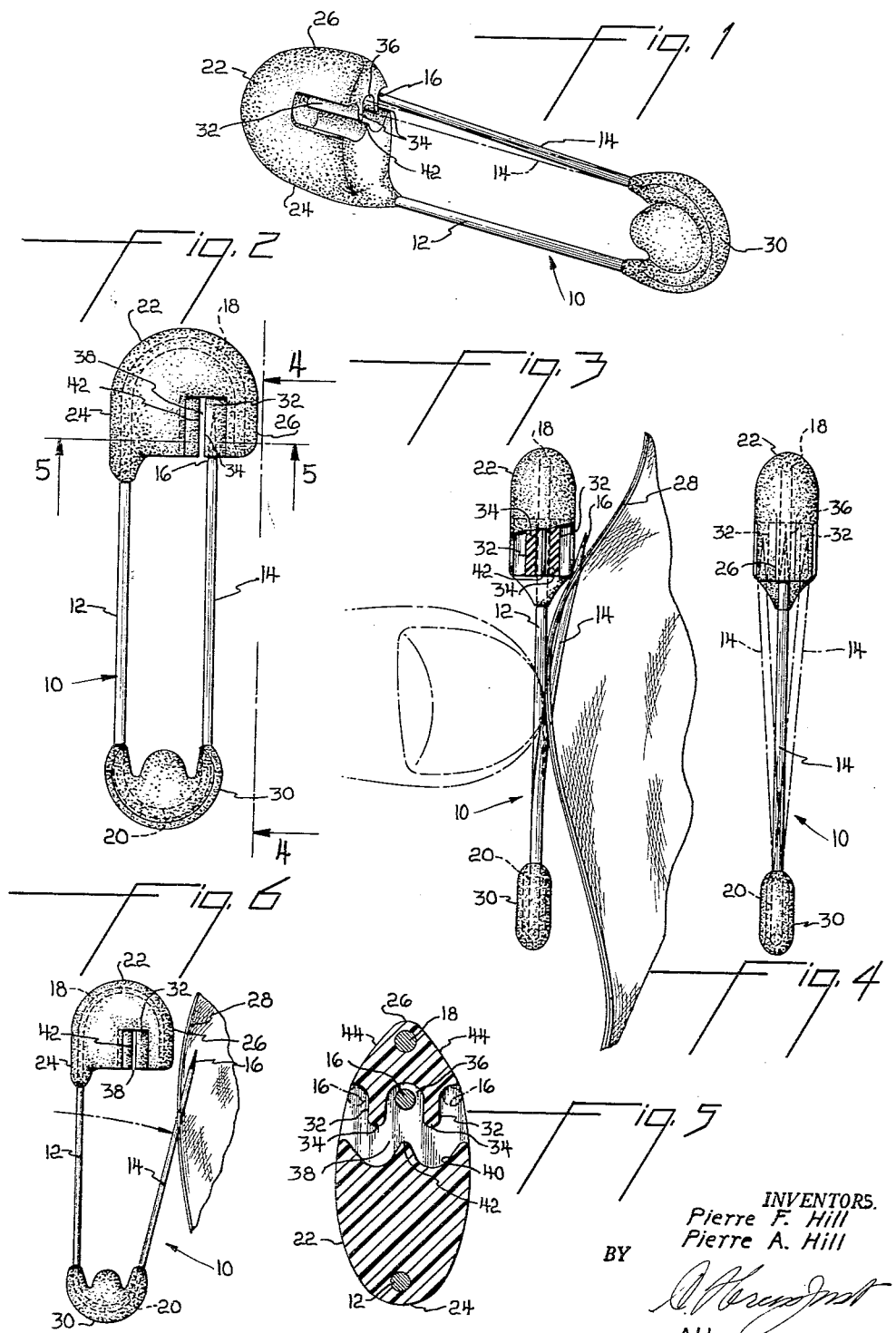
INVENTORS.
Pierre F. Hill
Pierre A. Hill
BY
Attorney

United States Patent Office 3,052,938
Patented Sept. 11, 1962

3,052,938
SAFETY PIN
Pierre F. Hill and Pierre A. Hill, both of
100 Edgewood Road, York, Pa.
Filed Feb. 15, 1961, Ser. No. 89,435
5 Claims. (Cl. 24—161)

This invention relates to a safety pin and, more particularly, to a safety pin of the type preferably to be used in connection with fastening personal garments or accessories, and more especially for use with children's and infants' apparel and accessories.

Various types of safety pins have been devised heretofore, the pointed ends of said pins being safe when the same are secured within heads or clasps on the pin, but, when the pin is in the so-called open position, the pointed end projects at an angle from the remainder of the pin and comprises a potentially dangerous item with which severe personal injury can be caused, unless said pointed end is secured within the clasp provided therefor.

In certain types of safety pins made heretofore, attempts have been made to render the same extra safe by employing various types of locking means for securing the pointed end of the pin within a shield or head, but, to a large extent, safety means of this type defeat the desired purposes of preferably providing a pin which can be placed in usable condition for insertion in the garments with a minimum of effort.

Other types of safety pins used heretofore have not only been complex in structure, but also have been relatively expensive to manufacture, notwithstanding the fact that they rendered the pin safe, from the standpoint that the pointed end of the pin effectively was shielded or contained within guard means or a housing head of either a movable or relatively stationary type.

The principal purpose of the present invention is to depart from the prior constructions of safety pins, preferably by providing a safety pin so constructed that when the leg of the safety pin having the pointed end thereon is released, the pointed end of the pin automatically will be moved quickly and effectively into one or more recesses provided in the head of the safety pin for receiving said pointed end and thereby prevent the same from being capable of inflicting personal injury.

Another object of the present invention is to provide a safety pin in which the pointed leg of the pin must be manually projected beyond the head to place it in position to be pushed through fabric, or the like, whereby, upon being released, the resilience of the material from which the pin is formed is adequate to cause relative movement between the pointed end of the pin and the protective recesses within the head of the pin, so as to dispose said pointed end within one of said recesses in a protective manner, whereby the pin closes safely, automatically.

A further object of the invention is to provide, in addition to preferably a plurality of protective recesses on the exterior of the head of the pin which automatically receive the pointed end thereof, there also is provided an interior recess so constructed that when the pointed end of the safety pin is disposed therein, it is substantially in locked position, whereby removal of the pointed end from said interior recess is accomplished by more extensive manual manipulation of the pin than is necessary to remove the pointed end of the pin from one of the exterior recesses within which it may be disposed.

Still other objects of the invention are to provide rugged construction in a safety pin embodying the other objectives of the invention, said ruggedness including reinforcing means and sturdiness capable of insuring long life and satisfactory use of the safety pin embodying the principles of the invention.

Details of the foregoing objects and of the invention, as well as other objects thereof, are set forth in the following specification and illustrated in the drawing comprising a part thereof.

In the drawing:

FIG. 1 is a perspective view of a safety pin embodying the principles of the present invention, the pin leg being shown in this view in one of a pair of exterior recesses, and in broken lines, the pin leg is shown in the interior recess of the head of the pin.

FIG. 2 is a plan view of the pin with the pointed end of the pin leg disposed within either the interior recess or the exterior recess of the opposite side of the head from that shown in FIG. 1.

FIG. 3 is an edge view of the safety pin embodying the invention with the head partly broken away to show details of the construction thereof, and the pin leg being flexed laterally from the head for projection through an exemplary piece of fabric.

FIG. 4 is a view similar to FIG. 3, but showing, in full lines, the pin leg disposed with the pointed end thereof in the interior recess and, in broken lines, the pin leg is shown with the pointed end thereof disposed, in exemplary manner, in each of the two exterior recesses in the head of the pin, as seen on the line 4—4 of FIG. 2.

FIG. 5 is an enlarged, sectional view of the head of the pin taken on the line 5—5 of FIG. 2.

FIG. 6 is a view similar to FIG. 2, but showing the pin leg projected laterally from the free edge of the head of the safety pin embodying the invention, as when the pointed end is being projected through an exemplary piece of fabric, thereby, in conjunction with FIG. 3, showing the versatility of the manner in which the pin may be projected through an article with which it is to be used.

The improved safety pin comprising the present invention comprises a preferably U-shaped pin unit 10 formed from resilient, stiff material, such as drawn brass, suitably plated, or other conventional metallic wire material, from which safety pins conventionally are made. One leg of the unit 10 comprises a back leg 12, and the other comprises a pin leg 14. The outer end 16 of the pin leg is pointed, and the outer end of the back leg 12 is curved upon itself to provide an overlapping, reinforcing extension 18 which overlaps the pointed end 16 of the pin leg 14. Preferably, the legs 12 and 14, the intermediate connecting bight 20, and the curved extension 18 are all integral and are shaped by a suitable, automatic machine to minimize the cost thereof.

Connected to the outer end of back leg 12 is a head 22, which is formed from any suitable molding material, and, preferably, from either a somewhat hardened rubber-like material, or an appropriate synthetic resin capable of being shape-retaining over long periods of time. The head 22 is molded substantially as illustrated in the various figures, the same preferably being molded so as to encase the curved, reinforcing extension 18 on the outer end of back leg 12 and the exterior thereof is generally rounded, as shown to best advantage in the various figures, as well as in cross-section, in FIG. 5, thereby contributing to the aesthetic appearance of the pin, as well as smoothness and safety in handling the same. By encasing the curved extension 18 within the molded material, the opposite edges 24 and 26 are maintained in stabilized relationship with each other.

When the pin unit 10 is shaped, the back leg 12 and pin leg 14 preferably are formed so as to be substantially parallel to each other, and the stock from which the pin unit 10 is formed is selected so as to afford substantial rigidity to the legs 12 and 14, whereby they possess adequate strength to substantially maintain the two legs in approximately parallel relationship at all times. However, the leg 14, particularly, is sufficiently flexible that it can be flexed laterally away from back leg 12 and outwardly from edge 26 of head 22, as illustrated in FIG. 6, so that the pointed end 16 of the pin leg 14 may be inserted through a piece of fabric 28, for example. The pin leg 14 is projected to said position manually and, when the leg 14 is released, the resilience of the material of the pin unit 10 is such that the leg 14 quickly will be restored to substantially parallel relationship with the back leg 12, as is shown in FIG. 2.

The pin leg 14 also may be flexed laterally, but away from one of the opposite faces of the head 22, as shown in FIG. 3, by manual force, so as to project the pointed end 16 thereof through a piece of fabric 28. To augment the natural resilience of the material from which the pin unit 10 is formed, however, there is provided, in accordance with the preferred construction of the instant invention, a molded reinforcing member 30 which surrounds the intermediate bight 20 of the pin unit, as shown, particularly, in FIGS. 1 and 2. The member 30 may be formed from the same material as that from which head 22 is molded, if desired, or an even stiffer, but, nevertheless, somewhat resilient, type of material may be used to form the member 30, if deemed preferable. It will be seen from the shape of the member 30, as illustrated in FIGS. 1 and 2, particularly, that it will add substantially to the stability of the intermediate bight 20 of the pin unit 10.

The head 22 is provided with a plurality of exterior recesses 32, the same being substantially parallel to the legs 12 and 14 of the pin unit, and substantially coincident with the normal position of the pointed end 16 of the pin leg 14 when in repose, whereby the pointed end closes safely, automatically.

The exterior recesses 32 are defined principally by a pair of parallel ribs 34, which are substantially parallel to each other and spaced apart to define an interior recess 36, which is parallel to and so positioned relative to the exterior recesses 32 that the same are substantially in side-by-side relationship, as best can be seen from FIG. 5. The interior recess 36 also is coincident with the pointed end 16 of the pin leg 14 when the latter is released from manual manipulation and in repose.

It will be seen that the recesses 32 and 36 are sufficiently long as readily to accommodate the pointed end 16 of the pin leg 14, as shown in FIGS 2 through 4. Also coextensive in length with said recesses is a passage 38, which extends transversely through the head 22; the surfaces of recesses 32, ribs 34 and interior recess 36 defining one wall of said transverse passage, while an irregular surface 40, best shown in FIG. 5, defines the other wall of said passage. The intermediate portion of the surface 40 comprises an internal cam 42, which extends toward the interior recess 36 and is substantially midway between the ribs 34, whereby, when it is desired to move the pointed end 16 of the pin leg 14 from one of the exterior recesses 32 into the interior recess 36 for more secure guarding or locking of the pointed end of the pin in a safe position, it is only necessary to manually push the pointed end 16 laterally against the curved surface defining the exterior recess 32 at one of the other sides of the head 22, thereby moving the pointed end into the transverse passage 38, where it will engage one of the cam surfaces of internal cam 42 and thereby guide the same substantially automatically into the internal, so-called locking recess 36, due primarily to the inherent resilience of the pin leg 14, as possibly augmented by the reinforcing member 30.

In operating the safety pin comprising the present invention, if the pin leg 14 is projected laterally to one side of the head 22, as shown in FIG. 3, for example, and the pointed end 16 is projected through a piece of fabric, or otherwise, following which the leg 14 is released, the pointed end 16 quickly and automatically will be returned to its normal position, in which it is coincident with one of the exterior recesses 32 and into which recess the pointed end will be disposed safely and automatically.

Assuming that no substantial amount of pull is placed upon the head 22, especially after the pointed end 16 and pin leg 14 have been woven or threaded through fabric, as is customary in utilizing a safety pin, the pointed end 16 will remain disposed within the exterior recess 32 within which it has been received. Should it be desired to render the safety pin even more safe, the pointed end 16 is pressed manually and laterally inward relative to the recess 32, whereby the pointed end 16 will move around the extremity of the rib 34 defining said recess and, by engaging internal cam 42, will be guided readily into interior recess 36.

In the event it is desired to use the safety pin in the manner illustrated in FIG. 6, whereby the pointed end 16 is moved laterally away from the edge 26, so as to insert the pointed end through a piece of fabric 28, for example, when either the pin leg 14 or the back leg 12 is released, as the case may be, the pointed end 16 will engage the crest of the edge 26 of the head 22 and, as readily seen from FIG. 5, the opposite surfaces 44 of the head adjacent the edge 26 slope away from said edge and from each other so as to constitute cam surfaces relative to which the pointed end 16 of the pin leg 14 will slide, as induced by the inherent resilience of the pin leg 14, and thereby move the pointed end until it is disposed within one of the exterior recesses 32. Thereafter, if desired, the pointed end may be moved into so-called locked position within the interior recess 36, if so desired, in the manner described above.

From the foregoing, it will be seen that the present invention provides a safety pin having a pin leg provided with a pointed end and a head provided with a plurality of exterior recesses, and also an interior recess, all respectively capable of receiving the pointed end of the pin leg when the pin is released from manual manipulation. Said pointed end will automatically be disposed at least in one of the exterior recesses within which it will be maintained safely guarded since, due to the principles of the invention and the inherent nature of the construction thereof, the pointed end normally cannot be disposed in any unguarded position, except when distorted from its normal position by manual manipulation. Further, an interior locking recess is likewise provided within which the pointed end may manually be disposed, so as to insure even greater safety for the pin than when the pointed end is disposed in one of the exterior recesses.

While the invention has been described and illustrated in its several preferred embodiments, it should be understood that the invention is not to be limited to the precise details herein illustrated and described, since the same may be carried out in other ways falling within the scope of the invention as claimed.

We claim:

1. A safety pin comprising, in combination, a flexible pin leg pointed at one end, a back leg, means connecting the other end of said pin leg to one end of said back leg and arranged to space said legs normally substantially in parallel relationship to each other, a head connected adjacent one edge to the opposite end of said back leg and extending therefrom toward said pointed end of said pin leg substantially within a plane in which said pin leg and back leg normally are disposed, said head having parallel recesses respectively extending inward from the opposite outer faces thereof and extending longitudinally of said head substantially in parallel relationship to said pin leg and positioned longitudinally of said head to receive the pointed end of said pin leg when under no appreciable tension, said recesses being open laterally outward from the plane occupied by said head, and cam surface means on the opposite edge of said head from said one edge and substantially parallel to and intermediate of said recesses, said cam surface means diverging outwardly and away from said opposite edge and being engageable by the pointed end of said pin leg when said leg is moved laterally away from its normal rest position within one of said recesses within said head and released, whereby said cam surfaces shunt said pointed end of said pin leg toward and into one of said recesses or the other.

2. The safety pin set forth in claim 1 further including a pair of parallel ribs carried by said head and positioned transversely inward from the outer sides of said head to form therebetween an interior recess and also respectively define the inner surfaces of said exterior recesses between which said interior recess is positioned parallelly, said interior recess being operable to receive said pointed end of said pin leg when the latter is flexed to permit said pointed end to pass said ribs and enter said interior recess.

3. The safety pin set forth in claim 2 further characterized by said head having a transverse passage extending laterally inward from said exterior recesses and communicating with said interior recess to permit movement of said pointed end of said pin leg into said interior recess from one of said exterior recesses when desired.

4. A safety pin comprising, in combination, a U-shaped unit formed from resilient, stiff material and one leg comprising a pin leg pointed at one end and the other leg being a back leg, said legs being connected by an intermediate bight and spaced apart in substantially parallel relationship and the outer end of said back leg having a reversely bent outer end extending toward the pointed end of said pin leg and normally substantially overlying the same within a common plane, a head formed from moldable material and encasing said reversely bent outer end of said back leg for reinforcement thereby and provided with substantially parallel exterior recesses respectively extending inward from the opposite outer faces thereof substantially in parallel relationship to said pin leg and also extending longitudinally of said head and open laterally outward from said common plane to receive the pointed end of said pin leg in one of said recesses in the normal rest position of said pointed end when under substantially no tension, and cam surface means formed on the exterior of the edge of said head farthest from said back leg and extending parallelly to said recesses and engageable by the pointed end of said pin leg when moved laterally away from its normal position of rest within one of said exterior recesses within said head and released, said cam surface means thereby being operable to shunt said pointed end of said pin leg toward and into one or the other of said exterior recesses, the exterior surface of said molded head being smoothly streamlined and rounded so as to present no sharp or otherwise harmful projections.

5. The safety pin set forth in claim 4 further including a reinforcement molded onto the curved, intermediate bight of said pin unit connecting said legs and operable to stiffen said unit, thereby to render said pointed end of said pin leg accurately positioned normally coincident with one of said exterior recesses and disposed therein when said pin leg is under substantially no tension.

References Cited in the file of this patent
UNITED STATES PATENTS

| | | |
|---|---|---|
| 481,834 | Snell | Aug. 30, 1892 |
| 1,963,446 | Peters | June 19, 1934 |
| 2,084,480 | Crandall | June 22, 1937 |
| 2,145,313 | Morley | Jan. 31, 1939 |
| 2,157,433 | Porter | May 9, 1939 |
| 2,456,820 | Edwards | Dec. 21, 1948 |
| 2,551,063 | Sneirson | May 1, 1951 |